United States Patent
Nagasawa

(10) Patent No.: US 9,097,929 B2
(45) Date of Patent: Aug. 4, 2015

(54) ELECTRONIC APPARATUS AND LIQUID CRYSTAL PANEL

(71) Applicant: Kabushiki Kaisha Toshiba, Tokyo (JP)

(72) Inventor: Norikazu Nagasawa, Ome (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 92 days.

(21) Appl. No.: 14/017,582

(22) Filed: Sep. 4, 2013

(65) Prior Publication Data

US 2014/0176890 A1 Jun. 26, 2014

Related U.S. Application Data

(63) Continuation of application No. PCT/JP2013/058792, filed on Mar. 26, 2013.

(30) Foreign Application Priority Data

Dec. 26, 2012 (JP) ................................ 2012-283293

(51) Int. Cl.
 *G02F 1/1333* (2006.01)
 *G02F 1/1362* (2006.01)
 *G02F 1/1343* (2006.01)

(52) U.S. Cl.
 CPC .... *G02F 1/133385* (2013.01); *G02F 1/134336* (2013.01); *G02F 1/136204* (2013.01); *G02F 1/136259* (2013.01); *G02F 2001/133388* (2013.01); *G02F 2001/136263* (2013.01)

(58) Field of Classification Search
 CPC .............. G02F 1/136259; G02F 2001/136263
 See application file for complete search history.

(56) References Cited

U.S. PATENT DOCUMENTS

| 6,271,600 | B1 | 8/2001 | Inada |
| 6,476,897 | B1 | 11/2002 | Watanabe et al. |
| 2005/0078235 | A1* | 4/2005 | Ozaki et al. ................... 349/55 |
| 2008/0284963 | A1 | 11/2008 | Kamiya et al. |
| 2012/0162165 | A1* | 6/2012 | Lee et al. ..................... 345/206 |

FOREIGN PATENT DOCUMENTS

| JP | 11-125834 | 5/1999 |
| JP | 11-163479 | 6/1999 |
| JP | 11-212110 | 8/1999 |
| JP | 2005-134935 | 5/2005 |
| JP | 2008-139604 | 6/2008 |
| JP | 2102-123041 | 6/2012 |

OTHER PUBLICATIONS

English Translation of International Search Report from corresponding PCT/JP2013/058792 application mailed Jun. 18, 2013.
International Search Report from corresponding PCT/JP2013/058792 application mailed Jun. 18, 2013.

* cited by examiner

*Primary Examiner* — Michael Caley
(74) *Attorney, Agent, or Firm* — Blakely Sokoloff Taylor & Zafman LLP

(57) ABSTRACT

According to one embodiment, an electronic apparatus includes a liquid crystal panel. The liquid crystal panel includes a first glass substrate, a second glass substrate, a first electrode on the first glass substrate, a second electrode on the second glass substrate, a liquid crystal portion, and a seal around the liquid crystal portion. The first electrode includes a first portion corresponding to the liquid crystal portion, a second portion corresponding to the seal, and a third portion electrically connecting the first portion and the second portion. The third portion is configured to disconnect an electrical connection between the first portion and the second portion when the second portion of the first electrode and the second electrode are short-circuited.

6 Claims, 3 Drawing Sheets

ELECTRONIC APPARATUS AND LIQUID CRYSTAL PANEL

CROSS REFERENCE TO RELATED APPLICATIONS

This application is a Continuation Application of PCT Application No. PCT/JP2013/058792, filed Mar. 26, 2013 and based upon and claiming the benefit of priority from Japanese Patent Application No. 2012-283293, filed Dec. 26, 2012, the entire contents of all of which are incorporated herein by reference.

FIELD

Embodiments described herein relate generally to electronic apparatuses comprising liquid crystal panels, and liquid crystal panels.

BACKGROUND

An active matrix liquid crystal display is provided. In addition, recently, a liquid crystal display is markedly thin.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view illustrating a portable computer as an example of an electronic apparatus of a first embodiment.

FIG. 2 is an exemplary cross-sectional view taken along line F2-F2 of a liquid crystal panel of the electronic apparatus illustrated in FIG. 1.

FIG. 3 is an exemplary plan view illustrating a first electrode, an LED board, and a power source circuit board of a liquid crystal panel of the electronic apparatus illustrated in FIG. 1.

FIG. 4 is an exemplary plan view illustrating a first electrode, an LED board, and a power source circuit board of a liquid crystal panel of a portable computer as an example of an electronic apparatus of a second embodiment.

DETAILED DESCRIPTION

Various embodiments will be described hereinafter with reference to the accompanying drawings.

In general, according to one embodiment, an electronic apparatus comprises a liquid crystal panel. The liquid crystal panel comprises a first glass substrate, a second glass substrate facing the first glass substrate, a first electrode on an inner surface of the first glass substrate, a second electrode on an inner surface of the second glass substrate, a liquid crystal portion between the first electrode and the second electrode, and a seal around the liquid crystal portion. The first electrode comprises a first portion corresponding to the liquid crystal portion, a second portion corresponding to the seal, and a third portion electrically connecting the first portion and the second portion. The third portion is configured to disconnect an electrical connection between the first portion and the second portion when the second portion of the first electrode and the second electrode are short-circuited.

Hereinafter, a first embodiment of an electronic apparatus is described with reference to FIGS. 1 to 3. As illustrated in FIG. 1, in the specification, a near side (i.e., a user side) is defined as a forward direction F, a back side seen by a user is defined as a backward direction B, a left side seen by the user is defined as a leftward direction L, a right side seen by the user is defined as a rightward direction R, an upper side seen by the user is defined as an upward direction U, and a lower side seen by the user is defined as a downward direction D.

As illustrated in FIG. 1, a portable computer 11 as an example of an electronic apparatus comprises a main unit 12, a display unit 13, and a hinge 14 provided between the main unit 12 and the display unit 13. The hinge 14 is in a shape of a thin and long rod as a whole. The hinge 14 rotatably supports the display unit 13 with respect to the main unit 12. The hinge 14 can cause the display unit 13 to rotate between a closed state in which the display unit 13 overlaps the main unit 12 such that a liquid crystal panel 15 of the display unit 13 faces a keyboard 16, and an open state in which the display unit 13 is raised with respect to the main unit 12.

For example, the main unit 12 comprises a main cabinet 21 formed in a shape of a box using a metal material, the keyboard 16 attached to an upper surface of the main cabinet 21 from the outside, and a touch pad 22 provided in front of the keyboard 16 on the upper surface of the main cabinet 21.

For example, the main cabinet 21 (i.e., casing) is made of a metal material such as a magnesium alloy. However, a material of the main cabinet 21 (i.e., casing) is not limited thereto. For example, a material of the main cabinet 21 (i.e., casing) may be a synthetic resin material, and may be another metal material such as an aluminum alloy. The main unit 12 further comprises a printed circuit board comprising a CPU and a plurality of circuit components in the main cabinet 21.

A rear surface of the display unit 13 is provided with a pair of rail portions 23 along a vertical direction of a display screen in both ends in a left-right direction. The hinge 14 described above can slide and move along the vertical direction of the display screen along the rail portions 23. When the hinge 14 slides and moves along the rail portions 23, the display unit 13 overlaps the main unit 12 such that the rear surface of the display unit 13 faces the keyboard 16 (i.e., the liquid crystal panel 15 faces outward).

As illustrated in FIGS. 1 and 3, the display unit 13 comprises the liquid crystal panel 15, a display cabinet 26 made of a synthetic resin surrounding the liquid crystal panel 15, an LED board (i.e., first board) comprising a plurality of LEDs (i.e., light sources) and configured to light the liquid crystal panel 15, and a power source circuit board 25 (i.e., second board) configured to supply power to the LED board 24 (i.e., power to each LED on the LED board 24). The display cabinet 26 may be made of a metal material similarly to the main cabinet 21. A housing comprises the display cabinet 26 and the main cabinet 21.

The liquid crystal panel 15 comprises: a first glass substrate 31; a second glass substrate 33 facing the first glass substrate 31; a first electrode 32 on an inner surface of the first glass substrate 31; a second electrode 34 on an inner surface of the second glass substrate 33; a liquid crystal portion 35 (i.e., liquid crystal layer) between the first electrode 32 and the second electrode 34; a seal 36 (i.e., seal portion) provided around the crystal portion 35 and sealing the liquid crystal portion 35; and a peripheral wall 37 covering ends of the first electrode 32 and the second electrode 34. The liquid crystal portion 35 comprises a pair of oriented films provided on an inner side of the first electrode 32 and an inner side of the second electrode 34, and liquid crystals enclosed between the oriented films. For example, the seal 36 is made of a UV curing adhesive and the like, and located between the first electrode 32 and the second electrode 34 to bond the first electrode 32 and the second electrode 34.

Figure 1:
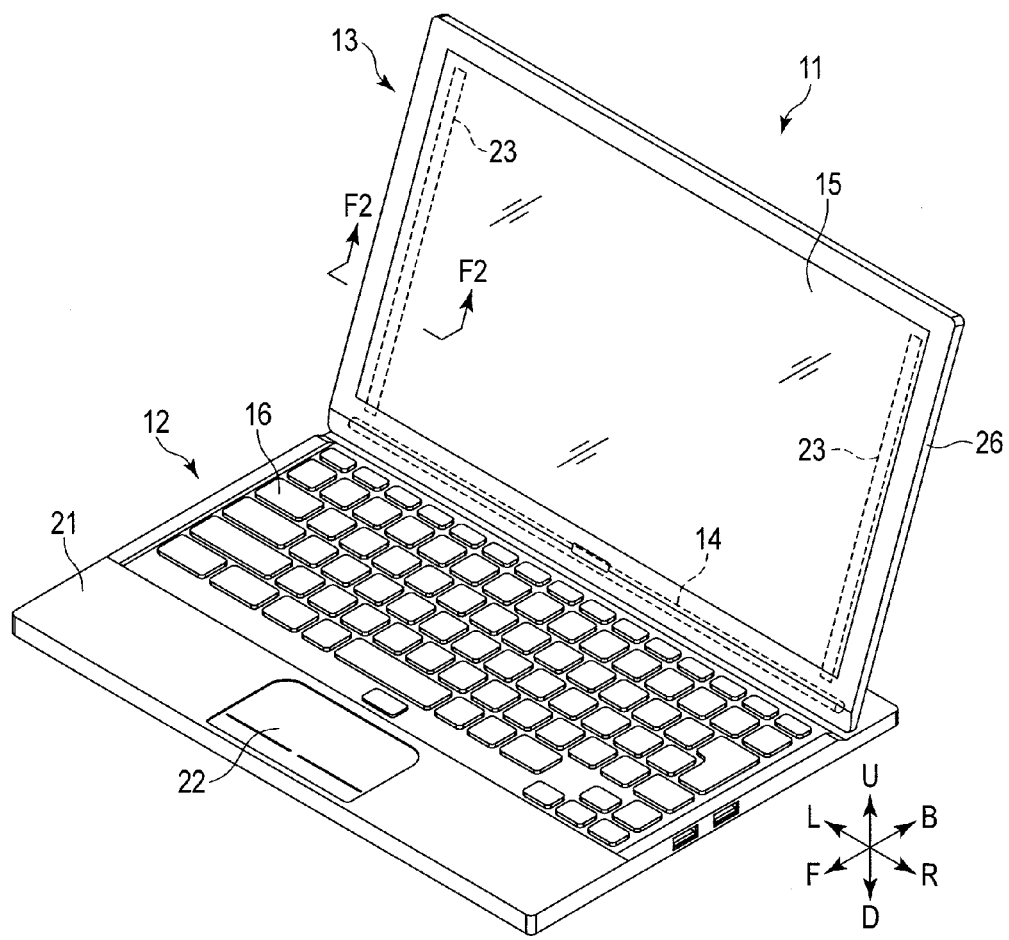
Figure 2:
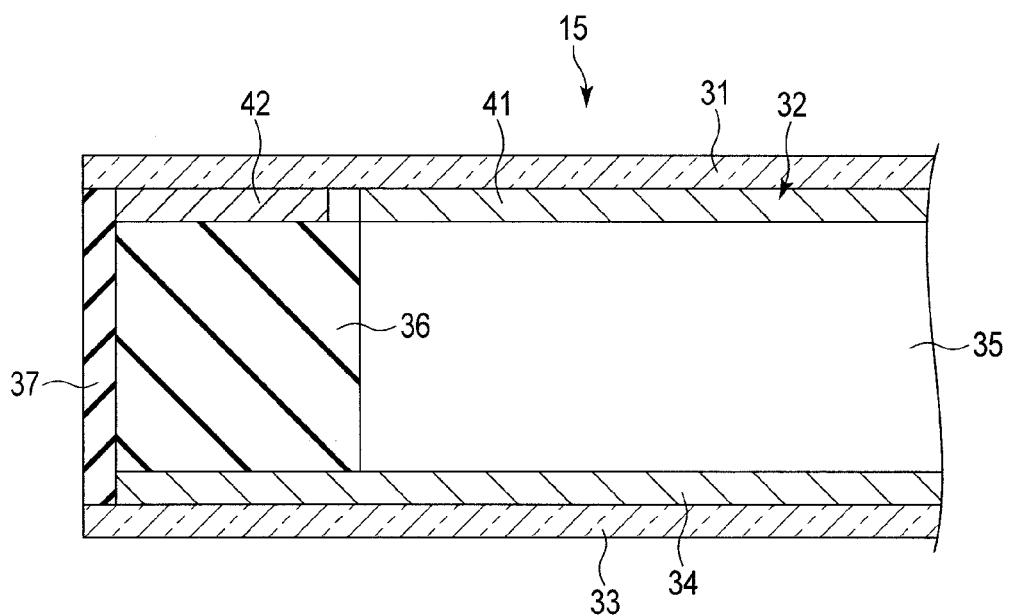
Figure 3:
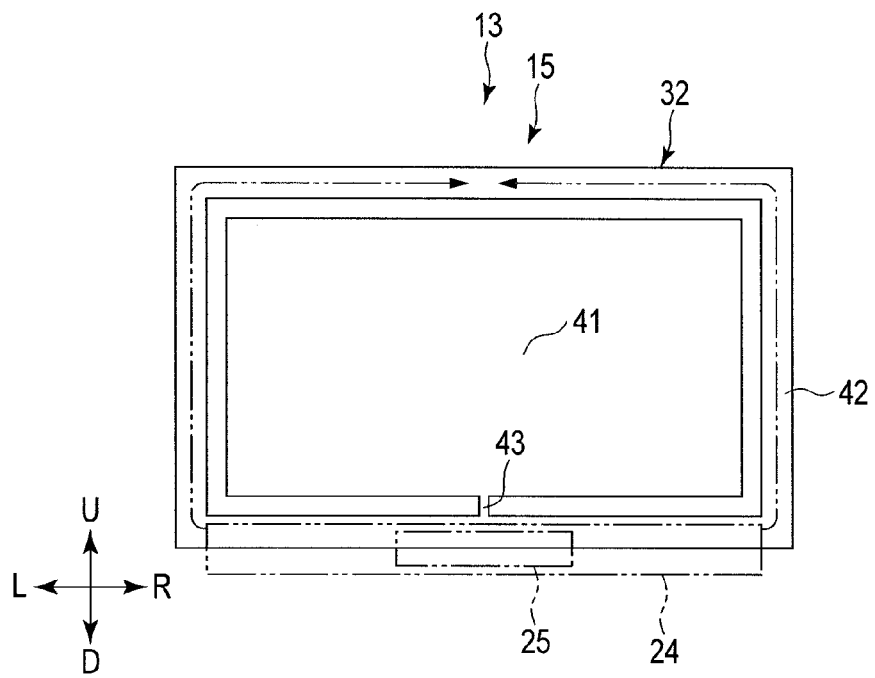

As illustrated in FIGS. 2 and 3, the first electrode 32 comprises a first portion 41 in a position corresponding to the liquid crystal portion 35, a second portion 42 in a position corresponding to the seal 36, and a third portion 43 electrically connecting the first portion 41 and the second portion 42 to each other. For example, the first portion 41 comprises a plurality of bands extending in a left-right direction, and the plurality of bands are arranged with a predetermined gap therebetween (In FIG. 3, the first portion 41 is illustrated as a single entity. However, in fact, the bands are separated from each other). One of the bands in the first portion 41 is connected to the second portion 42 via the third portion 43. The second portion 42 is in a shape of a frame around the first portion 41 and surrounding the first portion 41.

The first portion 41 and the second portion 42 are made of a transparent electrode such as a general ITO (indium tin oxide). The third portion 43 is made of a metal material comprising a low melting point such as an alloy of Pb (lead) and Sn (tin). The third portion 43 is configured like a current fuse, has a width less than that of the first portion 41 and the second portion 42, and is formed in a shape of a thin line. The width of the third portion 43 may be appropriately set depending on a condition such as a driving voltage of the liquid crystal panel 15, and may be set, for example, within a range of 0.1 mm to several mm.

The first portion 41, the second portion 42, and the third portion 43 are integrally formed by a photolithography or the like on the first glass substrate 31. When the first electrode 32 and the second electrode 34 are short-circuited, and an abnormal current flows through the third portion 43, the third portion 43 is melted due to generated heat resulting from the current flowing through the third portion 43.

The second electrode 34 comprises a plurality of bands extending in a direction (vertical direction) intersecting each band of the first portion 41 of the first electrode 32. The plurality of bands are disposed with a predetermined gap therebetween (In FIG. 2, the second portion 42 is illustrated as a single entity. However, in fact, the bands are separated from each other). The second electrode 34 is made of a transparent electrode such as a general ITO (indium tin oxide).

A plurality of LEDs is mounted on the LED board 24 with a predetermined gap between each other. However, each LED is not illustrated in FIG. 3. As illustrated in FIG. 3, for example, the LED board 24 overlaps a portion of the second portion 42 of the first electrode 32 at a position near the main unit 12 (i.e., position near a downward direction) in the display unit 13. Similarly, for example, the power source circuit board 25 overlaps a portion of the second portion 42 of the first electrode 32 at a position near the main unit 12 (i.e., position near a downward direction) in the display unit 13. For this reason, as illustrated by a two-dot chain line arrow in FIG. 3, a portion of heat generated from the LED board 24 and the power source circuit board 25 is actively diffused to a neighborhood of the first portion 41 through the second portion 42, in particular, to a side opposite to a position near the main unit 12 of the display unit 13 (i.e., position near an upward direction).

In the electronic apparatus of the embodiment, an effect of a case in which the first glass substrate 31 or the second glass substrate 33 is damaged at a position comprising the seal 36, and the first electrode 32 and the second electrode 34 come into contact with each other is described. In this case, the first electrode 32 and the second electrode 34 are electrically connected to each other (e.g., conduction), and a short circuit occurs between the first electrode 32 and the second electrode 34.

In this case, an abnormal current flows between the first electrode 32 and the second electrode 34, and the abnormal current flows to the third portion 43 of the first electrode 32. In this instance, the third portion 43 is melted due to generated heat resulting from the abnormal current flowing through the third portion 43, and an electrical connection between the first portion 41 and the second portion 42 is disconnected. In this way, a state in which the first electrode 32 and the second electrode 34 are short-circuited is resolved. When the liquid crystal panel 15 is normal, a current does not flow between the first electrode 32 and the second electrode 34.

According to the first embodiment, the electronic apparatus comprises the liquid crystal panel 15 comprising the first glass substrate 31, the second glass substrate 33 facing the first glass substrate 31, the first electrode 32 on an inner surface of the first glass substrate 31, the second electrode 34 on the inner surface of the second glass substrate 33, the liquid crystal portion 35 between the first electrode 32 and the second electrode 34, and the seal 36 provided around the liquid crystal portion 35. The first electrode 32 comprises the first portion 41 corresponding to the liquid crystal portion 35, the second portion 42 corresponding to the seal 36, and the third portion 43 electrically connecting the first portion 41 and the second portion 42 and configured to disconnect an electrical connection between the first portion 41 and the second portion 42 when the second portion 42 of the first electrode 32 and the second electrode 34 are short-circuited.

Generally, a portion where liquid crystals are enclosed (i.e., liquid crystal portion 35) is provided with a spacer, and a contact between the first electrode 32 and the second electrode 34 (i.e., a short circuit between the first electrode 32 and the second electrode 34) is frequently prevented by the spacer even when the glass substrate is damaged at a position corresponding to the liquid crystal portion 35. On the other hand, when the glass substrate is damaged near the seal 36 of the liquid crystal panel 15, the glass substrate may penetrate the seal 36, and a short circuit may occur between the first electrode 32 and the second electrode 34.

For this reason, a short circuit between the first electrode 32 and the second electrode 34 may be prevented by eliminating a pattern of the first electrode 32 or the second electrode 34 at a position corresponding to the seal 36. In addition, on the contrary, a dummy electrode may be disposed at a position corresponding to the seal 36, and the dummy electrode may be electrically separated from the first portion 41 of the first electrode 32.

In the former case, a level difference may be made at a position of a boundary between a position corresponding to the liquid crystal portion 35 and a position corresponding to the seal 36 and thus, there is a problem that strength of the liquid crystal panel 15 is weakened at the position of the boundary. In the latter case, the dummy electrode is separated from the first portion 41 and thus, there is a problem that it is unstable in terms of an electromagnetic wave (i.e., it becomes an antenna) when such a conductor is provided.

As described in the foregoing, according to a configuration of the embodiment, when a short circuit is generated between the first electrode 32 and the second electrode 34, and the third portion 43 breaks an electrical connection between the first portion 41 and the second portion 42, a short circuit state between the first electrode 32 and the second electrode 34 may be stopped. In this way, it is possible to provide an electronic apparatus which maintains sufficient strength of the liquid crystal panel 15, is stable in terms of an electromagnetic wave, and restricts a short circuit between the first electrode 32 and the second electrode 34. For this reason, it is possible to prevent the casing of the electronic apparatus from being damaged due to heat generated in a short circuit part.

The third portion 43 is melted due to generated heat resulting from a current flowing through the third portion 43 when a current flows between the first electrode 32 and the second electrode 34. According to this configuration, it is possible to cause the third portion 43 of the first electrode 32 to function as like a current fuse. In this way, it is possible to promptly stop a short circuit state between the first electrode 32 and the second electrode 34 without increasing a thickness of the liquid crystal panel 15.

The third portion 43 is integrally formed with the first portion 41 and the second portion 42 on the first glass substrate 31. According to this configuration, for example, the first portion 41, the second portion 42, and the third portion 43 of the first electrode 32 may be collectively formed by a technique such as a photolithography or printing. In this way, it is possible to enhance manufacturability and reduce the number of components without a need to separately mount a current fuse and the like on the glass substrate.

The electronic apparatus comprises the first board comprising a light source configured to light the liquid crystal panel 15, and the second board configured to supply power to the first board. The second portion 42 is in a shape of a frame surrounding the first portion 41, partially provided in a position overlapping the first board and the second board, and configured to diffuse heat transferred from the first board and the second board to the entire first portion 41. According to this configuration, it is possible to reduce the amount of heat transferred to the liquid crystal portion 35 from heat generated from the first board and the second board. In this way, it is possible to prevent display unevenness from occurring in the liquid crystal panel 15 due to an increased temperature of the liquid crystal portion 35.

Subsequently, a second embodiment of an electronic apparatus is described with reference to FIG. 4. A portable computer 11 as an example of the electronic apparatus of the second embodiment is different from that of the first embodiment in a configuration of a second portion 42 of a first electrode 32. However, the other portions are in common with the first embodiment. For this reason, a portion different from that of the first embodiment is mainly described, and a portion in common with the first embodiment is not illustrated or is not described.

The first electrode 32 comprises a first portion 41 provided at a position corresponding to a liquid crystal portion 35, a second portion 42 provided at a position corresponding to a seal 36, and a third portion 43 electrically connecting the first portion 41 and the second portion 42 to each other. The second portion 42 is in a shape of a frame as a whole, which is around the first portion 41 and surrounds the first portion 41. The second portion 42 is different from that of the first embodiment, and is divided into two parts at an intermediate position in a vertical direction. That is, the second portion 42 comprises a first part 42A provided at a position near a main unit 12, and a second part 42B provided at a position opposite to the main unit 12.

The third portion 43 is provided at each of two places to correspond to the two parts 42A and 42B of the second portions 42, respectively, which is different from that of the first embodiment. However, a shape and the like of the third portion 43 are similar to those of the first embodiment.

The first portion 41 and the second portion 42 are made of a transparent electrode such as a general ITO (indium tin oxide). The third portion 43 is made of a metal material comprising a low melting point such as an alloy of Pb (lead) and Sn (tin). The third portion 43 is configured like a current fuse, has a width less than that of the first portion 41 and the second portion 42, and is in a shape of a thin line. The width of the third portion 43 may be appropriately set depending on a condition such as a driving voltage of a liquid crystal panel 15, and may be set, for example, within a range of 0.1 mm to several mm.

The first portion 41, the second portion 42, and the third portion 43 are integrally formed by a photolithography or the like on the first glass substrate 31. When an abnormal current flows through the third portion 43, the third portion 43 is melted due to generated heat resulting from the current flowing through the third portion 43.

Figure 4:
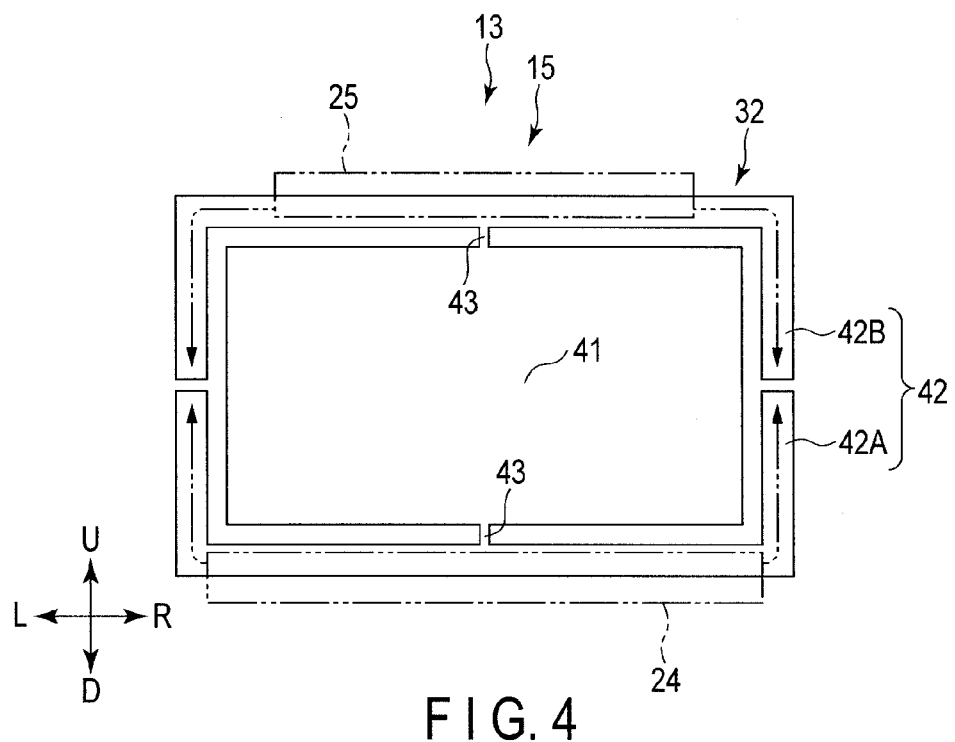

As illustrated in FIG. 4, for example, an LED board 24 (i.e., first board) overlaps the second portion 42 (e.g., first part 42A) of the first electrode 32 at a position near the main unit 12 (i.e., position near a downward direction) in the display unit 13. For example, a power source circuit board 25 (i.e., second board) overlaps the second portion 42 (e.g., second part 42B) of the first electrode 32 at a position opposite to the main unit 12 (i.e., position near an upward direction) in the display unit 13. The part of the second portion 42 overlapping the LED board 24 and the part of the second portion 42 overlapping the power source circuit board 25 are separately provided.

For this reason, heat generated from the LED board 24 diffuses to a half part (e.g., half part on a lower side) of the display unit 13 which is in a position near the main unit 12 through the second portion 42. However, the heat is rarely transferred to a half part (e.g., half part on an upper side) of the display unit 13 which is on the opposite side of the main unit 12. Similarly, heat generated from the power source circuit board 25 diffuses to the half part (e.g., half part on an upper side) of the display unit 13 which is on the opposite side of the main unit 12 through the second portion 42. However, the heat is rarely transferred to the half part (e.g., half part on a lower side) of the display unit 13 which is in a position near the main unit 12.

According to the second embodiment, the electronic apparatus comprises the first board comprising a light source configured to light the liquid crystal panel 15, and the second board configured to supply power to the first board. The second board is provided at a position separated from the first board. The second portion 42 is separated into the first part 42A provided at a position overlapping the first board and the second part 42B provided at a position overlapping the second board. The second portion 42 forms a shape of a frame surrounding the first portion 41 by the first part 42A and the second part 42B, and is configured to diffuse heat transferred from the first board and the second board to the entire first portion 41.

According to the configuration, it is possible to reduce the amount of heat transferred to a side of the liquid crystal portion 35 from heat generated from the first board and the second board. In this way, it is possible to prevent display unevenness from occurring in the liquid crystal panel 15 due to an increased temperature of the liquid crystal portion 35. Further, the first board which is a heat source and the second board are separately disposed. Thus, even when the first board and the second board generate heat at an amount exceeding an amount that may diffuse in the second portion 42, it is possible to prevent display unevenness from occurring in a portion of the liquid crystal panel 15.

The electronic apparatus is not limited to a use for the portable computer illustrated in the embodiments above, and may be implemented for another electronic apparatus such as, for example, a mobile phone and an electronic book reader.

Further, the electronic apparatus is not limited to the embodiments described above without change, and may be implemented by changing a component within a scope in an implementation phase. Further, various inventions may be conceived by appropriately combining a plurality of components disclosed in the embodiments described above. For example, several components may be removed from the entire components disclosed in the embodiments. Furthermore, a component for different embodiments may be appropriately combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising a liquid crystal panel, the liquid crystal panel comprising:
   a first glass substrate;
   a second glass substrate facing the first glass substrate;
   a first electrode on an inner surface of the first glass substrate;
   a second electrode on an inner surface of the second glass substrate;
   a liquid crystal portion between the first electrode and the second electrode;
   a seal around the liquid crystal portion;
   a first board comprising a light source configured to light the liquid crystal panel; and
   a second board configured to supply power to the first board,
      wherein the first electrode comprises:
      a first portion corresponding to the liquid crystal portion;
      a second portion corresponding to the seal, wherein the second portion (i) is in a shape of a frame surrounding the first portion, (ii) partially overlaps the first board and the second board, and (iii) is configured to diffuse heat transferred from the first board and the second board to the entire first portion; and
      a third portion electrically connecting the first portion and the second portion and configured to disconnect an electrical connection between the first portion and the second portion when the second portion of the first electrode and the second electrode are short-circuited.

2. The electronic apparatus of claim 1, wherein the third portion is configured to be melted by generated heat resulting from a current flowing through the third portion when the second portion of the first electrode and the second electrode are short-circuited.

3. The electronic apparatus of claim 2, wherein the third portion is integrally formed with the first portion and the second portion on the first glass substrate.

4. An electronic apparatus comprising a liquid crystal panel, the liquid crystal panel comprising:
   a first glass substrate;
   a second glass substrate facing the first glass substrate;
   a first electrode on an inner surface of the first glass substrate;
   a second electrode on an inner surface of the second glass substrate;
   a liquid crystal portion between the first electrode and the second electrode;
   a seal around the liquid crystal portion;
   a first board comprising a light source configured to light the liquid crystal panel; and
   a second board configured to supply power to the first board and located in a separate position from the first board, wherein the first electrode comprises:
      a first portion corresponding to the liquid crystal portion;
      a second portion corresponding to the seal, wherein the second portion comprises a first part overlapping the first board, and a second part overlapping the second board in a separate position from the first part, and the second portion is (i) in a shape of a frame surrounding the first portion by the first part and the second part and (ii) configured to diffuse heat transferred from the first board and the second board to the entire first portion; and
      a third portion electrically connecting the first portion and the second portion and configured to disconnect an electrical connection between the first portion and the second portion when the second portion of the first electrode and the second electrode are short-circuited.

5. The electronic apparatus of claim 4, wherein the third portion is configured to be melted by generated heat resulting from a current flowing through the third portion when the second portion of the first electrode and the second electrode are short-circuited.

6. The electronic apparatus of claim 5, wherein the third portion is integrally formed with the first portion and the second portion on the first glass substrate.

* * * * *